(12) United States Patent
Yamada

(10) Patent No.: US 8,935,540 B2
(45) Date of Patent: Jan. 13, 2015

(54) ELECTRONIC DEVICE

(75) Inventor: Youhei Yamada, Osaka (JP)

(73) Assignee: Kyocera Document Solutions Inc. (JP)

( * ) Notice: Subject to any disclaimer, the term of this patent is extended or adjusted under 35 U.S.C. 154(b) by 199 days.

(21) Appl. No.: 13/534,884

(22) Filed: Jun. 27, 2012

(65) Prior Publication Data

US 2013/0007472 A1 Jan. 3, 2013

(30) Foreign Application Priority Data

Jun. 30, 2011 (JP) .................................. 2011-145100

(51) Int. Cl.
*H04L 29/00* (2006.01)
*G06F 21/79* (2013.01)
*G06F 12/14* (2006.01)
*G06F 15/167* (2006.01)

(52) U.S. Cl.
CPC ............ *G06F 21/79* (2013.01); *G06F 12/1408* (2013.01); *G06F 12/14* (2013.01); *G06F 15/167* (2013.01)
USPC ........................................................ 713/193

(58) Field of Classification Search
CPC .... G06F 12/14; G06F 12/1408; G06F 15/167
See application file for complete search history.

(56) References Cited

U.S. PATENT DOCUMENTS

| | | | |
|---|---|---|---|
| 2005/0182822 A1* | 8/2005 | Daniel et al. ................... | 709/213 |
| 2007/0250717 A1 | 10/2007 | Kumagai et al. ............... | 713/176 |
| 2008/0002827 A1 | 1/2008 | Tachikawa ..................... | 380/203 |
| 2008/0178009 A1 | 7/2008 | Funahashi ...................... | 713/186 |
| 2009/0052664 A1 | 2/2009 | Goodman et al. .............. | 380/44 |
| 2009/0119785 A1 | 5/2009 | Challener et al. .............. | 726/34 |
| 2010/0142706 A1* | 6/2010 | Ryan et al. ..................... | 380/51 |
| 2011/0307941 A1* | 12/2011 | Dhanakshirur et al. ......... | 726/4 |

FOREIGN PATENT DOCUMENTS

| | | |
|---|---|---|
| JP | 2007-335996 | 12/2007 |
| JP | 2010-141500 | 6/2010 |
| JP | 2010-141501 | 6/2010 |
| JP | 2010-146500 | 7/2010 |
| JP | 2010-258679 | 11/2010 |
| JP | 2011-071651 | 4/2011 |

OTHER PUBLICATIONS

European Search Report dated Oct. 8, 2012 issued in corresponding European Patent Application No. 12174011.2 (5 pages).

* cited by examiner

*Primary Examiner* — Brandon Hoffman
*Assistant Examiner* — Michael D Anderson
(74) *Attorney, Agent, or Firm* — Ostrolenk Faber LLP

(57) ABSTRACT

An electronic device causing a removable storage medium to store data, the electronic device includes a removable storage medium, a storage medium interface connecting to the storage medium, and a control unit generating an encryption key at a predetermined time, encrypting data to be stored in the storage medium using the encryption key, storing encrypted data in the storage medium, and storing the encryption key in the storage medium in association with the encrypted data if it is detected that a removal operation of the storage medium has been made by a user.

4 Claims, 7 Drawing Sheets

ELECTRONIC DEVICE

BACKGROUND OF THE DISCLOSURE

Priority is claimed on Japanese Patent Application No. 2011-145100, filed Jun. 30, 2011, the content of which is incorporated herein by reference.

FIELD OF THE DISCLOSURE

The present disclosure relates to an electronic device causing a removable storage medium to store data.

DESCRIPTION OF RELATED ART

Recently, on some models of image forming devices such as copy machines or multifunction peripherals, a removable storage medium (removable medium) such as a USB (Universal Serial Bus) memory or an SD (Secure Digital) card can be freely mounted and removed.

Using such an image forming device, it is possible to print an image that is stored in a removable medium or to store a document image that is scanned by a scanner in the removable medium.

In these devices, in order to prevent information from leaking due to leaving a removable medium mounted on a device, techniques have been known which prevent the removable medium from the leaving by alerting a user when the leaving of removable medium mounted on the device is detected.

Up to now, the leaving removable medium mounted on the device has been recognized as a problem to be solved from the viewpoint of security, and some techniques for preventing the leaving have been developed.

However, such techniques are only to prevent the leaving itself, and fail to describe how to prevent information leakage when the leaving actually occurs.

Further, in consideration of a case where the leaving actually occurs, a method of preventing information leakage through encryption of image (data) and storing of the encrypted image in the removable medium may be considered.

However, in the case of using that method, pre-registration of an encryption key is necessary. Otherwise, there are issues such as only being able to decrypt the image on a specific PC, which cause inconvenience.

The present disclosure has been made to solve the above-mentioned problems occurring in the related art, and an object of the disclosure is to prevent the information leakage due to the leaving the removable storage medium mounted on or connected to the device while ensuring convenience for the user.

SUMMARY OF THE DISCLOSURE

According to a first aspect of the disclosure, there is provided an electronic device, which includes a removable storage medium; a storage medium interface connecting to the storage medium; and a control unit generating an encryption key at a predetermined timing, encrypting data to be stored in the storage medium using the encryption key, storing the encrypted data in the storage medium, and storing the encryption key in the storage medium in association with the encrypted data if it is detected that a removal operation of the storage medium has been made by a user.

In the electronic device according to the first aspect of the disclosure, it is preferable that after the control has stored the encryption key in the storage medium when detecting that a button to release the storage medium is pressed as the removal operation of the storage medium by the user, the storage medium be set to a removable state, and if a timeout of an automatic logout function occurs in a state where no operation is made by the user for a predetermined time, restore a connection state between the storage medium interface and the storage medium again to delete the encryption key from the storage medium.

Further, in the electronic device according to the first aspect of the disclosure, it is preferable that after the control unit has stored the encryption key in the storage medium when detecting that a logout button is pressed as the removal operation of the storage medium by the user, start a timer after setting the storage medium in a removable state, and if a timeout of the timer occurs in a state where the storage medium has not been removed, restore a connection state between the storage medium interface and the storage medium to delete the encryption key from the storage medium.

Further, in the electronic device according to the first aspect of the disclosure, it is preferable that the control unit encrypt the data to be stored in the storage medium using the encryption key, store the encrypted data in the storage medium, and if a timeout of an automatic logout function occurs in a state where no operation has been made by the user for a predetermined time, delete the encryption key stored in the storage medium, and remove the storage medium.

Furthermore, in the electronic device according to the first aspect of the disclosure, it is preferable that after the control unit has stored the encryption key in the storage medium if it is detected that a button to release the storage medium is pressed as the removal operation of the storage medium by the user, set the storage medium to a removable state, and if it is detected that a logout button is pressed thereafter, warn the user to remove the storage medium.

According to the disclosure, if the leaving the removable storage medium on the device occurs (if the removal operation of the storage medium is not made by the user), the encryption key is not stored in the storage medium, and thus a third person is unable to decrypt the data (data encrypted by the encryption key) stored in the storage medium to prevent the information leakage.

Furthermore, according to the disclosure, it is not necessary to pre-register the encryption key, and the user can decrypt the encrypt data on a general purpose computer using the encryption key stored in the storage medium, so that user convenience can be ensured.

That is, according to the disclosure, it is possible to prevent the information leakage due to the leaving the removable storage medium mounted on or connected to the device while ensuring convenience for the user.

DETAILED DESCRIPTION OF THE DISCLOSURE

Hereinafter, an embodiment of the disclosure will be described with reference to the drawings.

Also, as an example of an electronic device according to the disclosure, a multifunction peripheral having combined functions of a copy machine, a printer, and a facsimile, which is a type of image forming device, will be described hereinafter.

Figure 1:
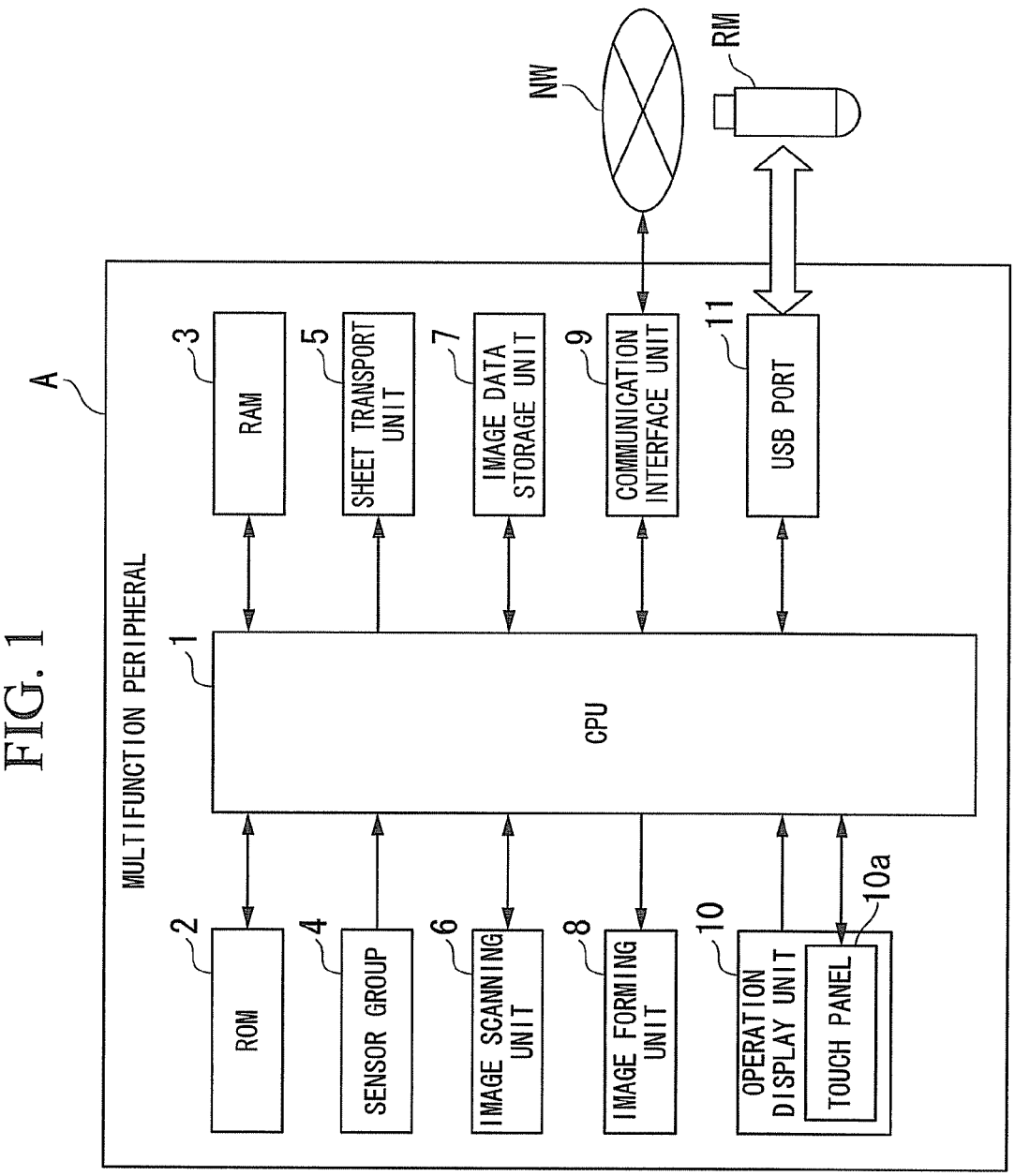
FIG. 1 is a function block diagram of a multifunction peripheral A (electronic device) according to an embodiment of the disclosure.

FIG. 1 is a function block diagram of a multifunction peripheral A according to an embodiment of the disclosure.

As shown in FIG. 1, the multifunction peripheral A is an image forming device on which a USB memory RM can be mounted as a removable storage medium (removable medium), and includes a CPU (Central Processing Unit) 1, a ROM (Read Only Memory) 2, a RAM (Random Access Memory) 3, a sensor group 4, a sheet transport unit 5, an image reading unit 6, an image data storage unit 7, an image forming unit 8, a communication interface unit 9, an operation display unit 10, and a USB port 11.

The CPU 1 controls the overall operation of the multifunction peripheral A based on control programs stored in the ROM 2, various detection signals received from the sensor group 4, document image data, print image data, and facsimile image data stored in the image data storage unit 7, various instructions input from a client computer (not illustrated) through the communication interface unit 9, and operating instructions input from the operation display unit 10.

Hereinafter, the details of the control processing of the CPU 1 will be described as the operation of the multifunction peripheral A.

The ROM 2 is a nonvolatile memory for storing the control programs executed by the CPU 1 and other data.

The RAM 3 is a volatile memory which is used as a working area that is a temporary storage of data when the CPU 1 executes the control programs to perform various operations.

The sensor group 4 includes various sensors that are necessary to perform the image forming operation, for example, such as an out of paper detection sensor, a sheet jam detection sensor, a sheet position detection sensor, a temperature sensor, and the like, and outputs various kinds of information detected by the respective sensors to the CPU 1 as detection signals.

The sheet transport unit 5 includes a transport roller for transporting printing sheets that are housed in a sheet tray to the image forming unit 8, a motor for driving the transport roller, a transport roller for transporting the printing sheets after the image forming process to an output tray (not illustrated), a motor for driving the transport roller, and the like.

The image reading unit 6 is provided with an ADF (Automatic Document Feeder), a CCD (Charge Coupled Device) sensor, and the like, and reads images of documents that are sequentially fed by the ADF through the CCD sensor, and outputs document image data based on the document image.

The image reading unit 6 outputs the document image data to the CPU 1.

At the same time, the CPU 1 stores the document image data in the image data storage unit 7.

The image data storage unit 7 includes, for example, a flash memory, and stores the document image data, print image data that the communication interface unit 9 receives from a client computer, and facsimile image data that the communication interface unit 9 receives from a public network E, under the instruction of the CPU 1.

Under the control of the CPU 1, the image forming unit 8 transfers an image forming image which is formed by toner onto the print sheet that is transported from the sheet transport unit 5 based on document image data, print image data, or facsimile image data that is stored in the image data storage unit 7, and a fuser roller performs fusing of the image forming image.

The communication interface unit 9 is connected to a client computer and a public network NW and transmits/receives various signals to/from the client computer and the public network NW.

The operation display unit 10 is provided with a copy function switching key, a print function selection key, a scan function selection key, a facsimile function selection key, a start key, a stop/clear key, a power key, a numeric key (numeric input key), a touch panel 10a, and other various operation keys. The operation display unit 10 outputs operating instructions of the respective keys to the CPU 1 and displays various screens on the touch panel 10a under the control of the CPU 1.

Additionally, the copy function selection key, the print function selection key, the scan function selection key, and the facsimile function selection key are keys for selecting operating modes of the respective functions in the multifunction peripheral A when a user selects the respective functions.

The USB port 11 is a serial interface corresponding to the USB standard, and electrically connects to the USB memory RM when the USB memory RM is mounted.

In the case where the USB port 11 is connected to the USB memory RM, it performs image data input/output with the USB memory RM under the control of the CPU 1.

Next, the operation of the multifunction peripheral A as configured above will be described.

<First Case>

First, the operation of the multifunction peripheral A in a case where a release button of the USB memory RM is pressed as a removal operation of the USB memory RM by a user, which refers to a first case, will be described with reference to a flowchart of FIG. 2.

Figure 2:
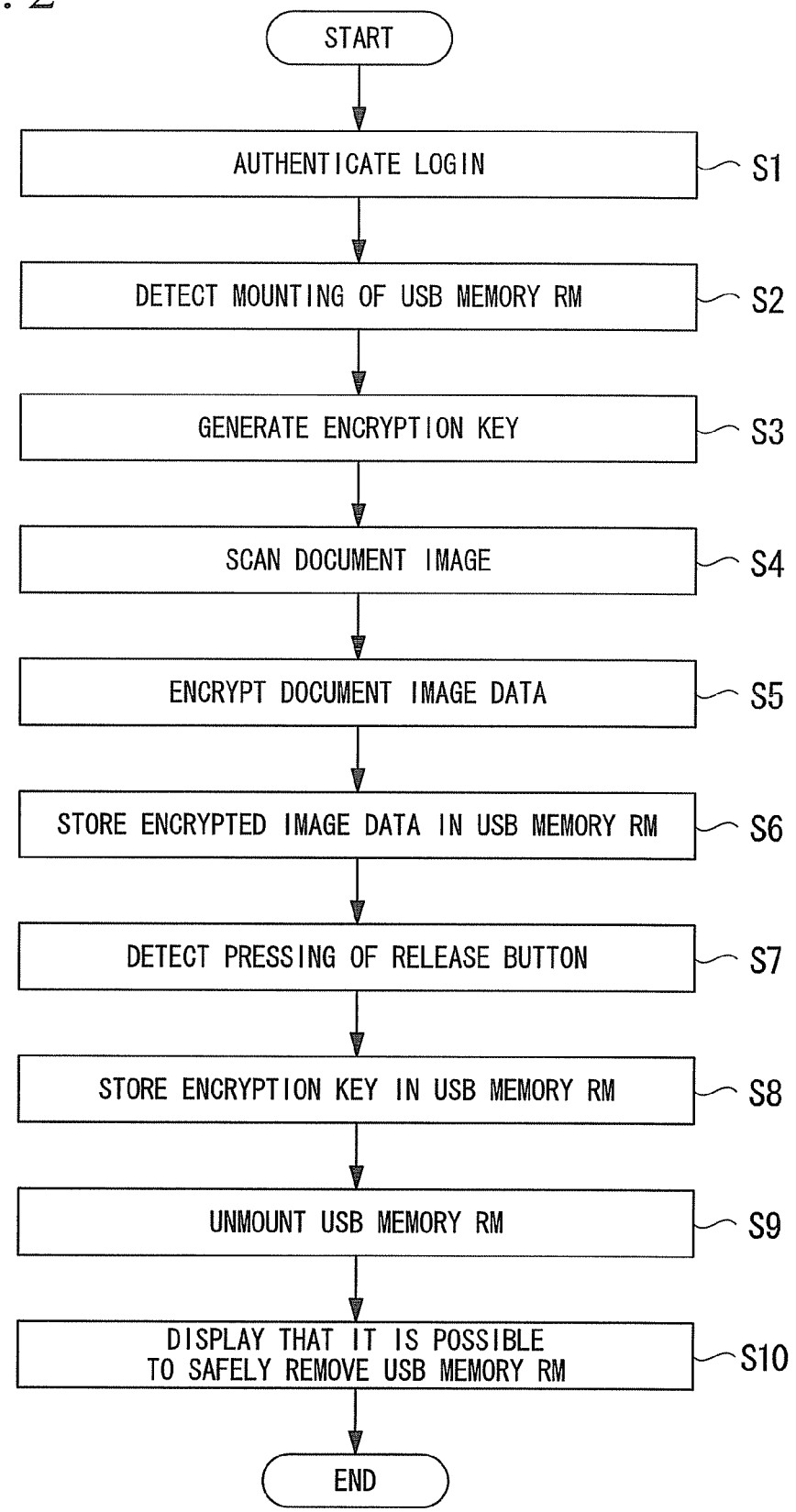
FIG. 2 is a flowchart illustrating the operation of the multifunction peripheral A in a first case.

As shown in FIG. 2, if the CPU 1 detects that the login operation has been made by a user based on the operation signal input from the operation display unit 10 while a login screen is displayed on the operation display unit 10 (touch panel 10a), the CPU 1 authenticates a login ID input by a user (step S1).

Furthermore, if the authentication of the login ID is completed and the CPU 1 detects that the USB memory RM is mounted on the USB port 11 (step S2), the CPU 1 generates an encryption key using a known encryption technology (step S3).

Here, it is preferable that the encryption key be generated, for example, using a ZIP file type encryption technology in consideration of the ease and compatibility of decoding in a general purpose computer.

Since a character string having a few characters can be used as an encryption key in the ZIP file, it is easy to input the character string to a general purpose computer.

In addition, since the ZIP file is supported as the standard in OS that is widely spread, such as Windows (registered trademark), it can be decrypted without introducing special software.

If the CPU 1 detects that the scan operation has been performed by a user based on the operation signal input from the operation display unit 10, the CPU 1 controls the image reading unit 5 to read the image of the document set in the image reading unit 5 by the user (step S4).

Then, the CPU 1 encrypts document image data obtained from the image reading unit 5 using the encryption key generated in step S3 (step S5), and stores the document image data after the encryption (hereinafter referred to as "encrypted image data") in the USB memory RM through the USB port 11 (step S6).

Thereafter, if the CPU 1 detects that the button to release the USB memory RM has been pressed (step S7), it stores the encryption key that is used to encrypt the document image data in the USB memory RM in association with the encrypted image data through the USB port 11 (step S8).

Although the button to release the USB memory RM is not shown in FIG. 1, it may be displayed on the touch panel 10a or a mechanical button may be separately installed as the release button.

Furthermore, the CPU 1 unmounts the USB memory RM, that is, sets the USB memory RM in a safely removable state (step S9), and controls the operation display unit 10 to display that the USB memory RM can be safely removed on the operation display unit 10 (step S10).

As described above, according to this embodiment, if leaving the USB memory RM on a device occurs (if removal operation of the USB memory RM is not made by the user), the encryption key is not stored in the USB memory RM, and thus a third person is unable to decrypt the encrypted image data stored in the USB memory RM to prevent the information leakage.

Also according to this embodiment, there is no need to register in advance the encryption key, and the user can decrypt the encrypted image data on a general purpose computer using the encryption key stored in the USB memory RM to secure the convenience of a user.

That is, according to this embodiment, it is possible to prevent the information leakage due to the leaving of the USB memory RM while securing the convenience of a user.

<Second Case>

Additionally, the operation of the multifunction peripheral A in a case where a logout button is pressed as a removal operation of the USB memory RM by a user, which refers to a second case, will be described with reference to a flowchart of FIG. 3.

Figure 3:
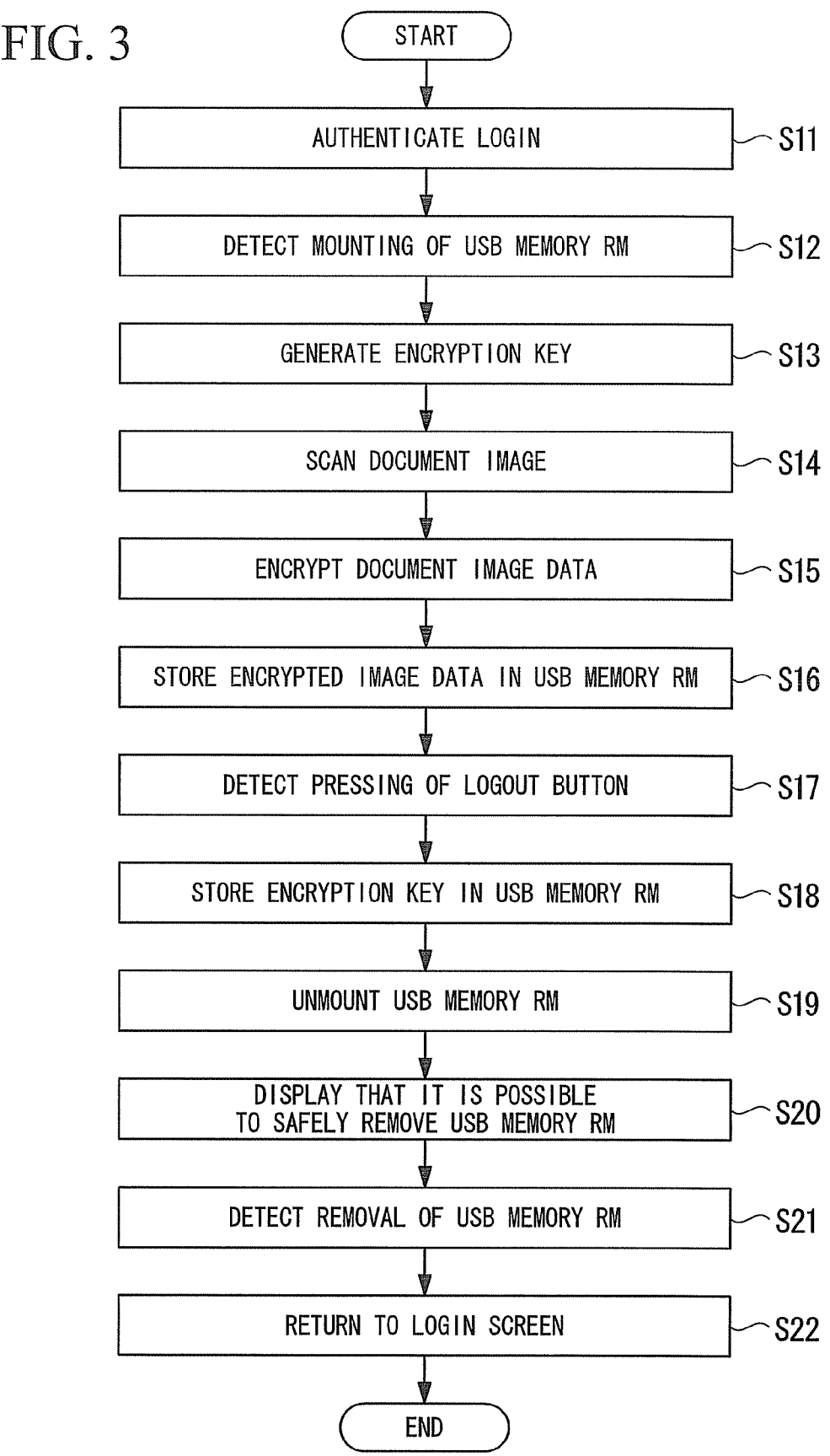
FIG. 3 is a flowchart illustrating the operation of the multifunction peripheral A in a second case.

As shown in FIG. 3, if the CPU 1 detects that the login operation has been made by a user based on the operation signal input from the operation display unit 10 while a login screen is displayed on the operation display unit 10 (touch panel 10a), the CPU 1 authenticates a login ID input by a user (step S11).

Furthermore, if the authentication of the login ID is completed and the CPU 1 detects that the USB memory RM is mounted on the USB port 11 (step S12), the CPU 1 generates an encryption key using a known encryption technology (step S13).

If the CPU 1 detects that the scan operation has been performed by a user based on the operation signal input from the operation display unit 10, the CPU 1 controls the image reading unit 5 to read the image of the document set in the image reading unit 5 by the user (step S14).

Then, the CPU 1 encrypts document image data obtained from the image reading unit 5 using the encryption key generated in step S13 (step S15), and stores the encrypted image data in the USB memory RM through the USB port 11 (step S16).

Thereafter, if the CPU 1 detects that the logout button has been pressed (step S17), it stores the encryption key, that is used to encrypt the document image data, in the USB memory RM in association with the encrypted image data through the USB port 11 (step S18).

This logout button is displayed on the touch panel 10a.

Then, the CPU 1 unmounts the USB memory RM (step S19), and controls the operation display unit 10 to display that the USB memory RM can be safely removed on the operation display unit 10 (step S20).

Also, if the CPU 1 detects that the USB memory RM has been removed (step S21), it controls the operation display unit 10 to display the login screen on the operation display unit 10 (step S22).

Even in the second case, in the same manner as the first case, the encryption key is stored in the USB memory RM only in the case where the removal of the USB memory is expressed through pressing of the logout button, and thus a third person is unable to decrypt the encrypted image data stored in the USB memory RM to prevent the information leakage.

<Third Case>

Next, the operation of the multifunction peripheral A in a case where a logout button is pressed in a state where the USB memory RM is not removed after a button to release the USB memory RM is pressed as a removal operation of the USB memory RM by a user, which refers to a third case, will be described with reference to a flowchart of FIG. 4.

Figure 4:
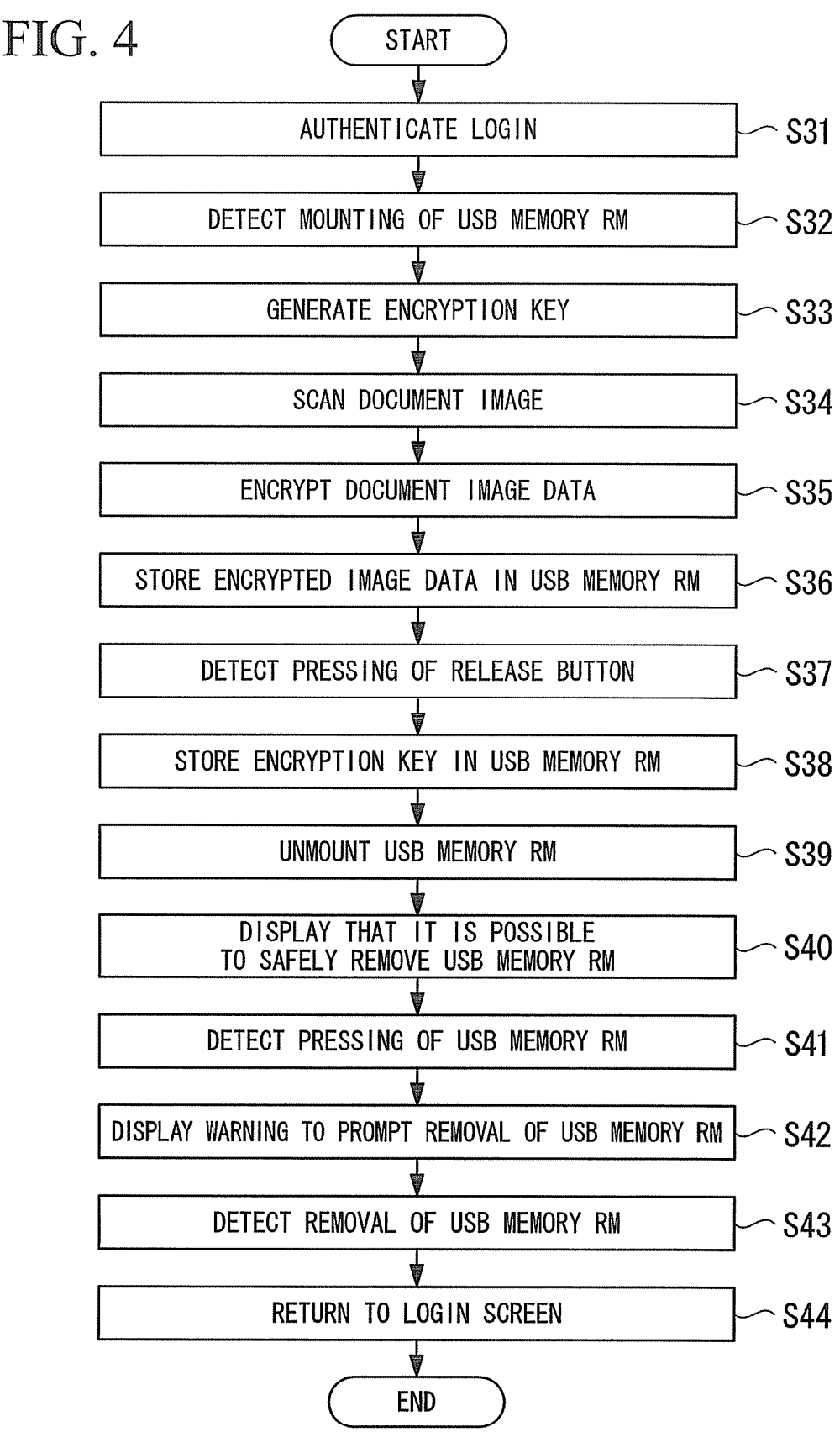
FIG. 4 is a flowchart illustrating the operation of the multifunction peripheral A in a third case.

As shown in FIG. 4, if the CPU 1 detects that the login operation has been made by a user based on the operation signal input from the operation display unit 10 while a login screen is displayed on the operation display unit 10 (touch panel 10a), the CPU 1 authenticates a login ID input by a user (step S31).

Furthermore, if the authentication of the login ID is completed and the CPU 1 detects that the USB memory RM is mounted on the USB port 11 (step S32), the CPU 1 generates an encryption key using a known encryption technology (step S33).

If the CPU 1 detects that the scan operation has been performed by a user based on the operation signal input from the operation display unit 10, the CPU 1 controls the image reading unit 5 to read the image of the document set image reading unit 5 by the user (step S34).

Then, the CPU 1 encrypts document image data obtained from the image reading unit 5 using the encryption key generated in step S33 (step S35), and stores the encrypted image data in the USB memory RM through the USB port 11 (step S36).

Thereafter, if the CPU 1 detects that the button to release the USB memory RM has been pressed (step S37), it stores the encryption key, that is used to encrypt the document image data, in the USB memory RM in association with the encrypted image data through the USB port 11 (step S38).

Then, the CPU 1 unmounts the USB memory RM (step S39), and controls the operation display unit 10 to display that the USB memory RM can be safely removed on the operation display unit 10 (step S40).

Thereafter, if the CPU 1 detects that the logout button has been pressed (step S41), it controls the operation display unit 10 to display a warning screen for instructing a user to remove the USB memory RM on the operation display unit 10 (step S42).

Then, if the CPU 1 detects that the USB memory RM has been removed (step S43), it controls the operation display unit 10 to display the login screen (step S44).

As described above, in the case where the logout button is pressed in a state where the USB memory RM is not removed after the button to release the USB memory RM is pressed as the removal operation of the USB memory RM by the user, the leaving of the USB memory RM can be prevented by displaying the warning screen for instructing the user to remove the USB memory RM.

<Fourth Case>

Next, the operation of the multifunction peripheral A in a fourth case (where a removal operation of the USB memory RM by a user is not performed even though a predetermined time elapses after the encrypted image data is stored in the USB memory RM) will be described with reference to a flowchart of FIG. 5.

Figure 5:
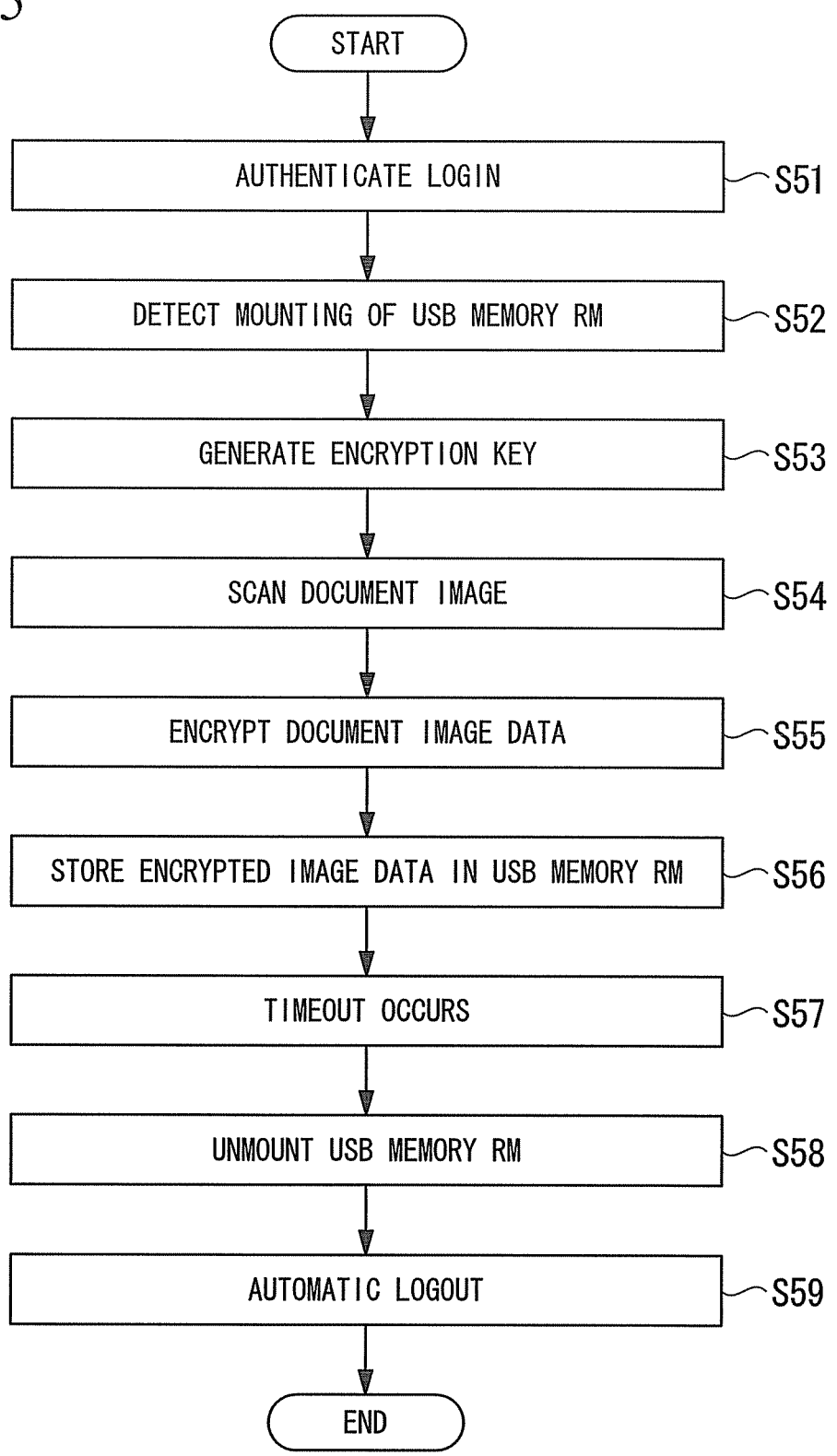
FIG. 5 is a flowchart illustrating the operation of the multifunction peripheral A in a fourth case.

As shown in FIG. 5, if the CPU 1 detects that the login operation has been made by a user based on the operation signal input from the operation display unit 10 while a login screen is displayed on the operation display unit 10 (touch panel 10a), the CPU 1 authenticates a login ID input by a user (step S51).

In addition, if the authentication of the login ID is completed and the CPU 1 detects that the USB memory RM is mounted on the USB port 11 (step S52), the CPU 1 generates an encryption key using a known encryption technology (step S53).

If the CPU 1 detects that the scan operation has been performed by a user based on the operation signal input from the operation display unit 10, the CPU 1 controls the image reading unit 5 to read the image of the document set image reading unit 5 by the user (step S54).

Then, the CPU 1 encrypts document image data obtained from the image reading unit 5 using the encryption key generated in step S53 (step S55), and stores the encrypted image data in the USB memory RM through the USB port 11 (step S56).

If a timeout of an automatic logout function occurs after the encrypted image data is stored in the USB memory RM (step S57), the CPU 1 unmounts the USB memory RM (step S58), and performs automatic logout (step S59).

The automatic logout function is an existing function to automatically log out in the case where no operation is made by the user for a predetermined time.

As described above, if the timeout of the automatic logout function occurs (if any operation to the multifunction peripheral A is not made by the user for the predetermined time) after the encrypted image data is stored in the USB memory RM, encryption key is not stored in the USB memory RM, and thus it becomes possible to remove the USB memory RM.

Through this, even if the user has been away from the multifunction peripheral A in a state where the USB memory RM is left on the multifunction peripheral A, the encryption key is not stored in the USB memory RM, and thus it is possible to prevent the information leakage to a third person.

<Fifth Case>

Next, in the fifth case, the operation of the multifunction peripheral A will be described with reference to a flowchart of FIG. 6, in a case where a button to release the USB memory RM is pressed as a removal operation of the USB memory RM by a user, an encryption key is stored in the USB memory RM, and the USB memory RM is not removed even though a predetermined time elapses after the USB memory RM enters a removable state.

Figure 6:
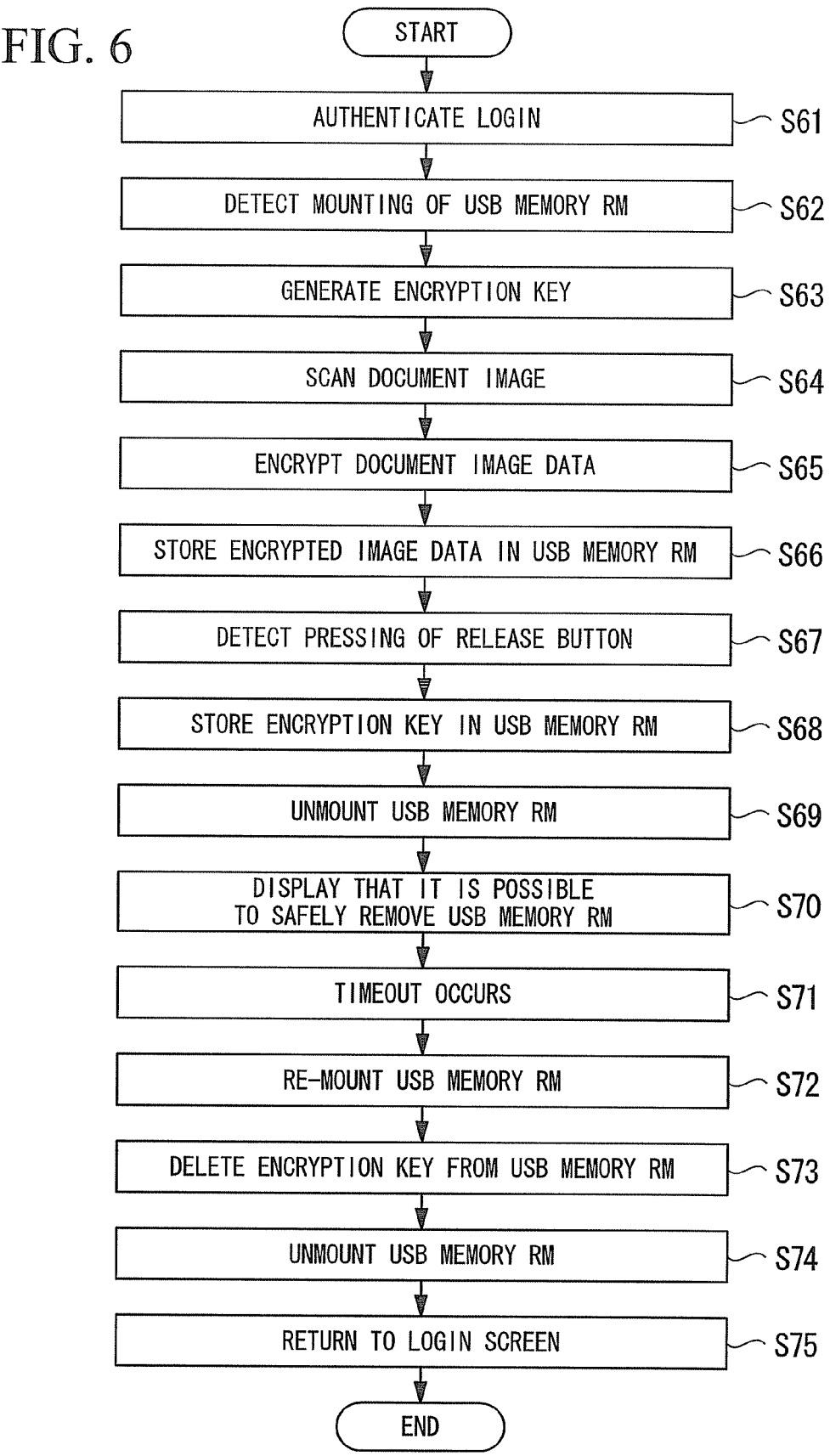
FIG. 6 is a flowchart illustrating the operation of the multifunction peripheral A in a fifth case.

As shown in FIG. 6, if the CPU 1 detects that the login operation has been made by a user based on the operation signal input from the operation display unit 10 while a login screen is displayed on the operation display unit 10 (touch panel 10a), the CPU 1 authenticates a login ID input by a user (step S61).

Additionally, if the authentication of the login ID is completed and the CPU 1 detects that the USB memory RM is mounted on the USB port 11 (step S62), the CPU 1 generates an encryption key using a known encryption technology (step S63).

If the CPU 1 detects that the scan operation has been performed by a user based on the operation signal input from the operation display unit 10, the CPU 1 controls the image reading unit 5 to read the image of the document set image reading unit 5 by the user (step S64).

Then, the CPU 1 encrypts document image data obtained from the image reading unit 5 using the encryption key generated in step S63 (step S65), and stores the encrypted image data in the USB memory RM through the USB port 11 (step S66).

Thereafter, if the CPU 1 detects that the button to release the USB memory RM has been pressed (step S67), it stores the encryption key that is used to encrypt the document image data in the USB memory RM in association with the encrypted image data through the USB port 11 (step S68).

Also, the CPU 1 unmounts the USB memory RM (step S69), and controls the operation display unit 10 to display that the USB memory RM can be safely removed on the operation display unit 10 (step S70).

If a timeout of an automatic logout function occurs after the USB memory RM is unmounted (step S71), the CPU 1 remounts the USB memory RM (restore the connection state between the USB port 11 and the USB memory RM) (step S72).

Then, the CPU 1 unmounts the USB memory RM again (step S74) after deleting the encryption key from the USB memory RM (step S73), and controls the operation display unit 10 to display the login screen thereon (step S75).

As described above, if the button to release the USB memory RM is pressed as the removal operation of the USB memory RM by the user, the encryption key is stored in the USB memory RM, and the timeout of the automatic logout function occurs after the USB memory RM enters a removable state (if no operation to the multifunction peripheral A is made by the user for the predetermined time), the encryption key is deleted from the USB memory RM.

Through this, even if the user has been away from the multifunction peripheral A in a state where the USB memory RM is left on the multifunction peripheral A, the encryption key is not stored in the USB memory RM through deletion of the encryption key, and thus it is possible to prevent information leakage to a third person.

<Sixth Case>

Further, the operation of the multifunction peripheral A will be described with reference to a flowchart of FIG. 7, in a sixth case (where a logout button is pressed as a removal operation of the USB memory RM by a user, an encryption key is stored in the USB memory RM, and the USB memory RM is not removed even though a predetermined time elapses after the USB memory RM enters a removable state).

Figure 7:
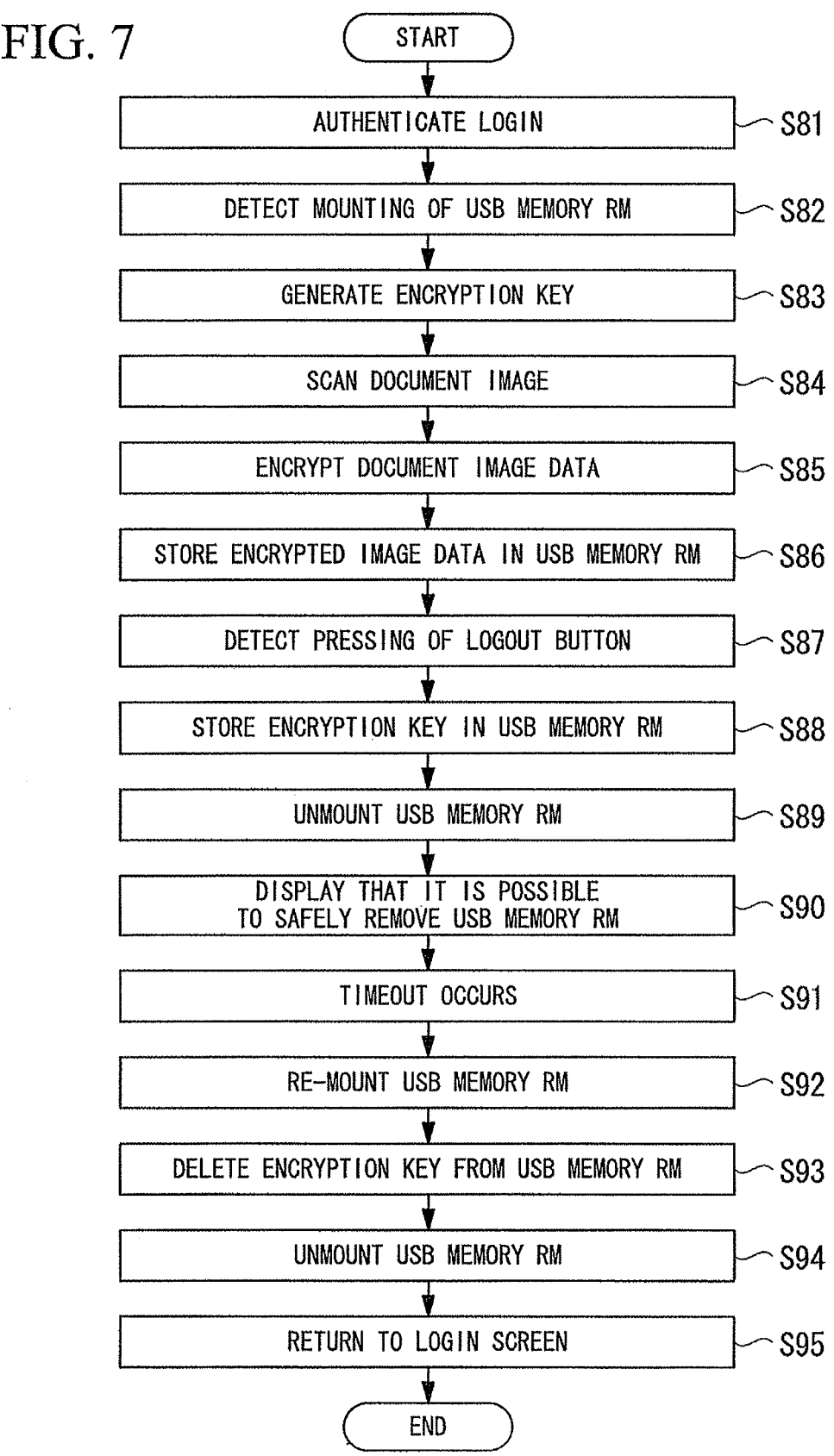
FIG. 7 is a flowchart illustrating the operation of the multifunction peripheral A in a sixth case.

As shown in FIG. 7, if the CPU 1 detects that the login operation has been made by a user based on the operation signal input from the operation display unit 10 while a login screen is displayed on the operation display unit 10 (touch panel 10a), the CPU 1 authenticates a login ID input by a user (step S81).

Further, if the authentication of the login ID is completed and the CPU 1 detects that the USB memory RM is mounted on the USB port 11 (step S82), the CPU 1 generates an encryption key using a known encryption technology (step S83).

If the CPU 1 detects that the scan operation has been performed by a user based on the operation signal input from the operation display unit 10, the CPU 1 controls the image reading unit 5 to read the image of the document set image reading unit 5 by the user (step S84).

Then, the CPU 1 encrypts document image data obtained from the image reading unit 5 using the encryption key generated in step S83 (step S85), and stores the encrypted image data in the USB memory RM through the USB port 11 (step S86).

Thereafter, if the CPU 1 detects that the logout button has been pressed (step S87), it stores the encryption key that is used to encrypt the document image data in the USB memory RM in association with the encrypted image data through the USB port 11 (step S88).

Further, the CPU 1 unmounts the USB memory RM (step S89), and controls the operation display unit 10 to display that the USB memory RM can be safely removed on the operation display unit 10 (step S90).

If the CPU 1 starts a timer after unmounting the USB memory RM and a timeout of an automatic logout function occurs in a state where the USB memory RM is not removed (step S91), the CPU 1 re-mounts the USB memory RM (step S92).

Then, the CPU 1 unmounts the USB memory RM again (step S94) after deleting the encryption key from the USB memory RM (step S93), and controls the operation display unit 10 to display the login screen thereon (step S95).

As described above, if the logout button is pressed as the removal operation of the USB memory RM by the user, the encryption key is stored in the USB memory RM, and the USB memory RM is not removed even though the predetermined time elapses after the USB memory RM enters a removable state, the encryption key is deleted from the USB memory RM.

Through this, even if the user has been away from the multifunction peripheral A in a state where the USB memory RM is left on the multifunction peripheral A, the encryption key is not stored in the USB memory RM through deletion of the encryption key, and thus it is possible to prevent the information leakage to a third person.

As described above, although one embodiment of the present disclosure has been described, the present disclosure is not limited to the embodiment, and various modifications can be made without departing from the scope of the disclosure.

For example, in the above-described embodiment, the USB memory RM is exemplified as the removable storage medium (removable medium). However, the present disclosure is not limited thereto, and can be applied to multifunction peripherals that can mount overall storage media, such as an SD card, a compact flash (registered trademark), a memory stick, a smart medium, a floppy (registered trademark) disk, a CD-RW, a DVD-RW, a MO disk, and the like.

Also, in the above-described embodiment, the pressing the button to release the USB memory RM or the pressing of the logout button has been exemplified as the removal operation of the USB memory RM by the user. However, other removal operations of the USB memory RM may be used.

In addition, in the above-described embodiment, it is exemplified that the encryption key is generated at a time when the mounting of the USB memory RM onto the multifunction peripheral A is detected. However, the timing for generating the encryption key is not limited thereto, and for example, the encryption key may be generated at a time when the login authentication is completed.

Furthermore, according to the above-described embodiment, description has been made with reference to the multifunction peripheral A as the image forming device. However, the present disclosure is not limited thereto, and the present disclosure can be applied to other image forming devices such as a copy machine, a printer, a scanner, and a facsimile.

Additionally, the disclosure can be applied to any electronic device that is provided with a storage medium interface connected to a removable storage medium as other electronic devices except for the image forming device.

While preferred embodiments of the disclosure have been described and illustrated above, it should be understood that these are exemplary of the disclosure and are not to be considered as limiting. Additions, omissions, substitutions, and other modifications can be made without departing from the scope of the present disclosure. Accordingly, the disclosure is not to be considered as being limited by the foregoing description, and is only limited by the scope of the appended claims.

What is claimed is:

1. An electronic device causing a removable storage medium to store data, the electronic device comprising:
   the removable storage medium;
   a storage medium interface connecting to the storage medium; and
   a control unit generating an encryption key at a predetermined timing, encrypting data to be stored in the storage medium using the encryption key, and storing the encrypted data in the storage medium,
   wherein when a removal operation of the storage medium made by a user is detected, the control unit stores the encryption key in the storage medium in association with the encrypted data, and
   the control unit stores the encryption key in the storage medium when detecting that a button to release the storage medium is pressed as the removal operation of the storage medium by the user, sets the storage medium in a removable state, and
   when a timeout of an automatic logout function occurs in a state where no operation is made by the user for a predetermined time, the control unit restores a connection state between the storage medium interface and the storage medium to delete the encryption key from the storage medium.

2. An electronic device causing a removable storage medium to store data, the electronic device comprising:
   the removable storage medium;
   a storage medium interface connecting to the storage medium; and
   a control unit generating an encryption key at a predetermined timing, encrypting data to be stored in the storage medium using the encryption key, and storing the encrypted data in the storage medium,
   wherein when a removal operation of the storage medium made by a user is detected, the control unit stores the encryption key in the storage medium in association with the encrypted data, and
   the control unit stores the encryption key in the storage medium when detecting that a logout button is pressed as the removal operation of the storage medium by the user, starts a timer after setting the storage medium in a removable state, and
   when a timeout of the timer occurs in a state where the storage medium is left on the device, the control unit restores a connection state between the storage medium interface and the storage medium to delete the encryption key from the storage medium.

3. An electronic device causing a removable storage medium to store data, the electronic device comprising:
   the removable storage medium;

a storage medium interface connecting to the storage medium; and a control unit generating an encryption key at a predetermined timing, encrypting data to be stored in the storage medium using the encryption key, and storing the encrypted data in the storage medium, wherein when a removal operation of the storage medium made by a user is detected, the control unit stores the encryption key in the storage medium in association with the encrypted data, and the control unit encrypts the data to be stored in the storage medium using the encryption key, stores the encrypted data in the storage medium, and when a timeout of an automatic logout function occurs in a state where no operation is made by the user for a predetermined time, the control unit sets the storage medium in a removable state without storing the encryption key in the storage medium.

4. An electronic device causing a removable storage medium to store data, the electronic device comprising: the removable storage medium;

a storage medium interface connecting to the storage medium; and a control unit generating an encryption key at a predetermined timing, encrypting data to be stored in the storage medium using the encryption key, and storing the encrypted data in the storage medium, wherein when a removal operation of the storage medium made by a user is detected, the control unit stores the encryption key in the storage medium in association with the encrypted data, and the control unit stores the encryption key in the storage medium when it is detected that a button to release the storage medium is pressed as the removal operation of the storage medium by the user, sets the storage medium in a removable state, and when activation thereafter of a logout button is detected, the control unit causes transmission of a warning to the user to remove the storage medium.

* * * * *